(12) United States Patent
Weber et al.

(10) Patent No.: US 10,399,783 B2
(45) Date of Patent: Sep. 3, 2019

(54) CONVEYING MEMBER WITH ROLLER MECHANISM

(71) Applicant: WRH Walter Reist Holding AG, Ermatingen (CH)

(72) Inventors: Thomas Weber, Winkel (CH); Carl Conrad Mäder, Hittnau (CH); René Moor, Pfungen (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 15/542,679

(22) PCT Filed: Jan. 4, 2016

(86) PCT No.: PCT/CH2016/000001
§ 371 (c)(1),
(2) Date: Jul. 11, 2017

(87) PCT Pub. No.: WO2016/112471
PCT Pub. Date: Jul. 21, 2016

(65) Prior Publication Data
US 2017/0369251 A1 Dec. 28, 2017

(30) Foreign Application Priority Data

Jan. 13, 2015 (CH) ...................... 0041/15

(51) Int. Cl.
*B65G 17/24* (2006.01)
*B65G 47/00* (2006.01)
(Continued)

(52) U.S. Cl.
CPC ............. *B65G 17/24* (2013.01); *B65G 17/08* (2013.01); *B65G 47/268* (2013.01); *B65G 17/065* (2013.01); *B65G 2201/0235* (2013.01)

(58) Field of Classification Search
None
See application file for complete search history.

(56) References Cited

U.S. PATENT DOCUMENTS 4,598,815 A * 7/1986 Adama ................. B65G 13/10
198/370.09
6,073,747 A * 6/2000 Takino .................. B65G 13/10
198/370.09
(Continued)

FOREIGN PATENT DOCUMENTS

EP  1 398 282    3/2004
EP  2 746 196    6/2014
(Continued)

OTHER PUBLICATIONS

English translation of International Preliminary Report on Patentability dated Jul. 18, 2017 (Jul. 18, 2017), Application No. PCT/CH2016/000001, 10 pages.
(Continued)

*Primary Examiner* — Kavel Singh
(74) *Attorney, Agent, or Firm* — Rankin, Hill & Clark LLP

(57) ABSTRACT

A conveying member for a conveyor includes a conveying element with a main surface, and a roller mechanism having a roller holder and at least one roller with a physical roller pivot. The roller holder can interact with an actuating device, is arranged on the conveying element and is designed such that the roller pivot is movable relative to the main surface of the conveying element between a first position and a second position. In the first and second positions of the roller pivot, the roller projects partly beyond the main surface of the conveying element. In the first position of the roller pivot, the roller assumes an arrested position in which rotation of the roller is arrested, and in the second position
(Continued)

of the roller pivot, the roller assumes a freewheel position in which the roller rotates freely.

15 Claims, 6 Drawing Sheets

(51) Int. Cl.
*B65G 17/08* (2006.01)
*B65G 47/26* (2006.01)
*B65G 17/06* (2006.01)

(56) References Cited

U.S. PATENT DOCUMENTS

| | | | |
|---|---|---|---|
| 6,318,544 B1 * | 11/2001 | O'Connor | B65G 17/24 198/779 |
| 7,360,641 B1 | 4/2008 | Fourney | |
| 8,701,871 B2 * | 4/2014 | Fourney | B65G 17/24 198/697 |
| 2004/0173441 A1 * | 9/2004 | Wieting | B65G 17/067 198/850 |
| 2005/0126896 A1 | 6/2005 | Wieting et al. | |
| 2010/0059334 A1 | 3/2010 | Riddick et al. | |
| 2015/0307283 A1 * | 10/2015 | Andreoli | B65G 17/086 198/852 |

FOREIGN PATENT DOCUMENTS

| | | |
|---|---|---|
| WO | 01/32533 | 5/2001 |
| WO | 2012/151127 | 11/2012 |

OTHER PUBLICATIONS

Switzerland Search Report dated Feb. 18, 2015, Application No. CH 00041/15, 3 pages.

* cited by examiner

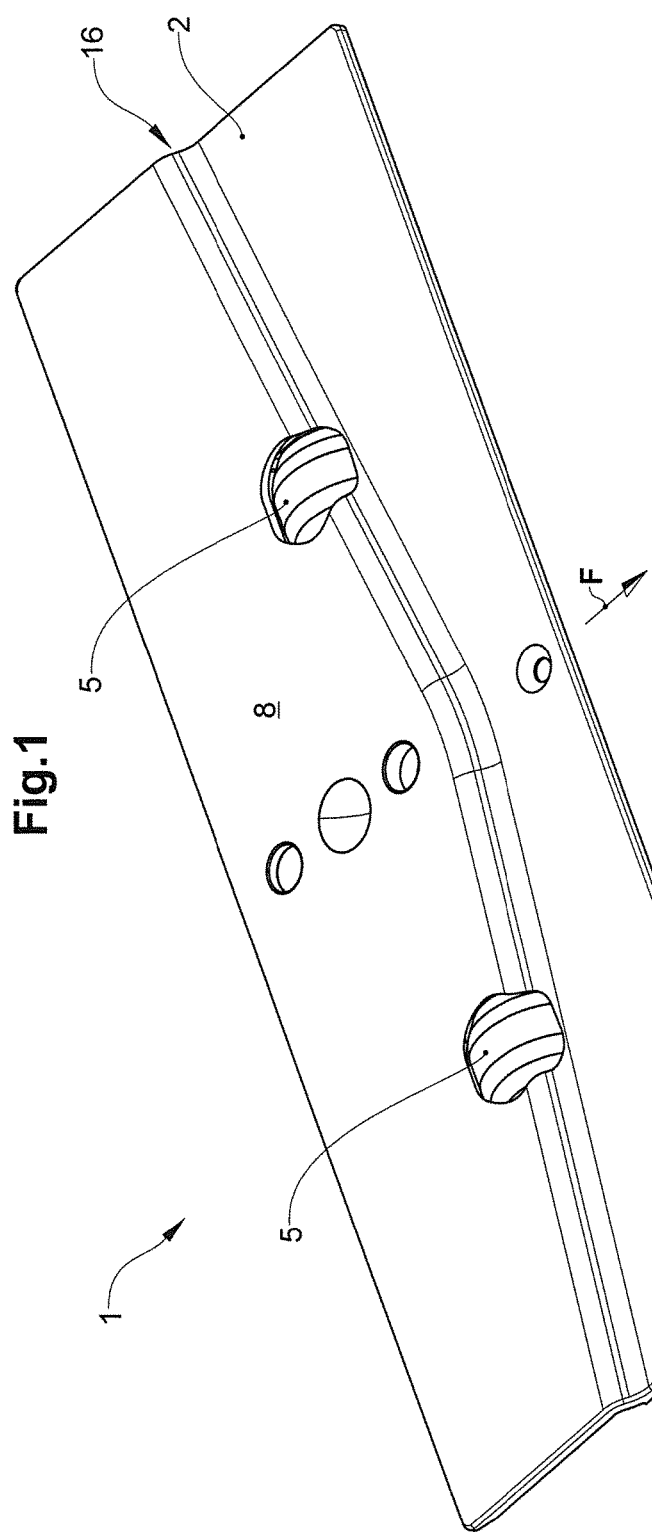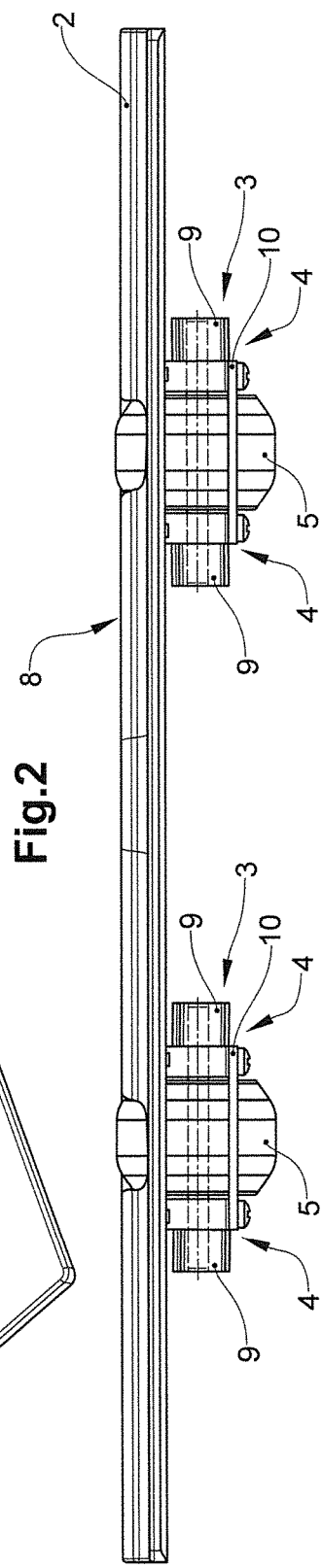

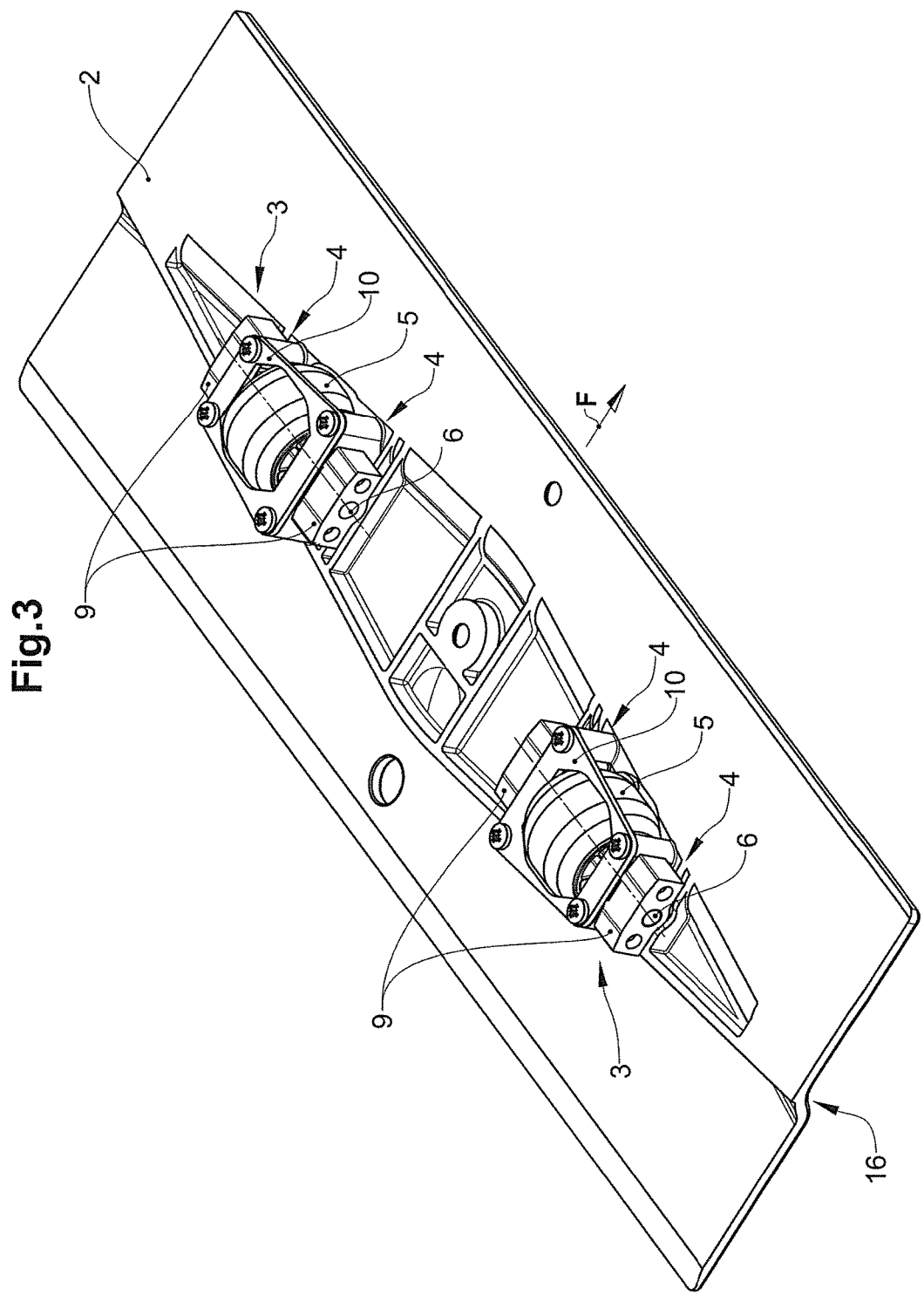

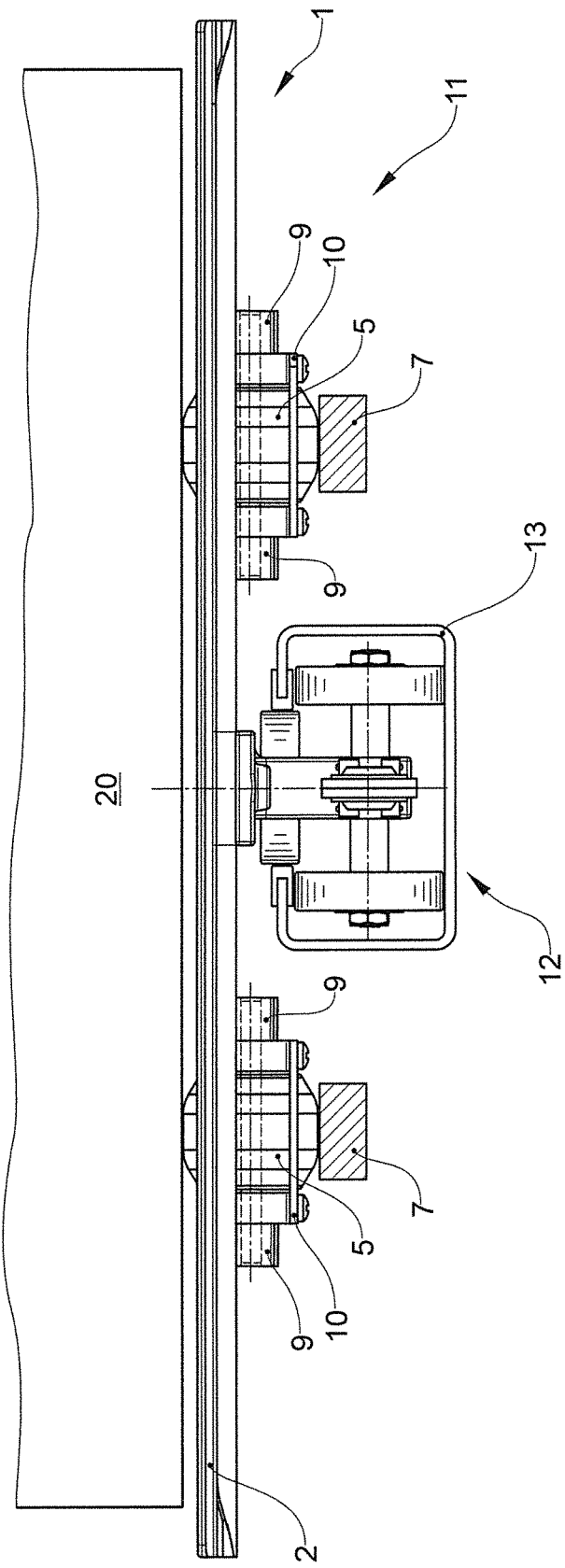

CONVEYING MEMBER WITH ROLLER MECHANISM

BACKGROUND OF THE INVENTION

Field of the Invention

The invention relates to the field of conveying members for a conveyor, and in particular to the field of conveying members for an accumulating conveyor. These conveying members include a conveying element, which forms a main surface, and at least one roller mechanism with at least one roller. The invention moreover relates to conveyors that include such conveying members.

Description of Related Art

Such a conveying member is known, for example, from WO 01/32533. A modular belt chain whose modules include a unit that can be retracted relative to the main surface of the modules is described in this document. Here, on the one hand, the unit can project beyond the main surface and, on the other hand, can be arranged flush with the main surface or below this. Amongst other things, the retractable unit can include a roller, which in one embodiment of the retractable unit is freely rotatable and, in another embodiment of the retractable unit, is driven. In a further embodiment, the retractable unit can include rigid drivers. In this manner, the modular belt chain can either convey the conveyed objects on the main surface of the modules in a manner assisted by drivers or also without drivers, on freely rotatable rollers or on driven rollers, depending on the embodiment and the position of the retractable unit.

Such a known module, which can be described as a conveying member, however has the disadvantage that the retractable units take up much space in the retracted condition, by which means the conveying members are not able to be compactly designed.

The described, known conveying member also has the disadvantage that a specific embodiment of the retractable unit is required for each individual change in the type of conveying (with or without drivers, on freely rotatable rollers or not, on driven rollers or not). This results in a cumbersome and complicated design of the conveying member, particularly if more than only two types of conveying are to be possible.

Each change of the type of conveying thus necessitates a specific embodiment of the retractable unit, which moreover must be present on the module in a sufficiently high number in order to be able to fulfil its function. The conveying members therefore need to be provided with a high number of different retractable units, depending on the demands. This also results in a cumbersome and complicated design of the conveying member.

A complete retraction of the retractable module can result in long paths between the retracted position of the retractable module and the non-retracted position. Due to large distances between both positions, the retractable module can only be moved slowly between the two positions or however rapidly and amid a high material loading.

The cumbersome and complicated design of the conveying member entails high costs on manufacture, maintenance and repair. Cumbersome and complicated designs are moreover prone to wear and defects.

A cumbersome and complicated design of the conveying member moreover results in a high weight of the conveying member in the case of a robust embodiment and this leads to high energy consumption on moving the conveying member.

SUMMARY OF THE INVENTION

It is therefore the object of the invention to create a conveying member of the initially mentioned type and/or a conveyor with such a conveying member, the conveying member and conveyor at least partly overcoming at least one of the disadvantages which are mentioned above.

The inventive conveying member for a conveyor includes a conveying element and at least one roller mechanism. The conveying element forms a main surface. The roller mechanism includes at least one roller, which includes a physical roller pivot, and a roller holder. The roller pivot is fastened to the roller holder. The roller holder can interact with an actuating means. The roller holder is arranged on the conveying element and is designed in a manner such that the roller pivot is movable relative to the main surface of the conveying element at least between a first position and a second position, which is spatially different from the first position. In the first as well as in the second position of the roller pivot, the roller projects at least partly beyond the main surface of the conveying element. In the first position of the roller pivot, the roller is able to assume an arrested position. In the second position of the roller pivot, the roller is able to assume a freewheel position. Here, the roller in the arrested position is arrested with respect to a rotation relative to the main surface and in the freewheel position is freely rotating.

In particular, the conveying member is designed in a manner such that the roller projects at least partly beyond the main surface of the conveying element in the first and in the second position of the roller pivot as well as in all positions on a displacement path between the first and the second position of the roller pivot.

In particular, the roller holder is designed in a manner such that the roller projects at least partly beyond the main surface of the conveying element in all possible positions of the roller pivot in the roller holder.

In particular, the conveying member is a conveying member for an accumulating conveyor.

In particular, the object to be conveyed is a piece good. The object to be conveyed, for example, can be a package, a bundle, a collecting container or a shell.

The conveying member can be designed, for example, as a plate for fastening to a conveying means. The conveying means can be loaded in tension and/or compression by way of the conveying. The conveying member can be designed for instance as a plate for fastening to a pull means and in particular to a chain of a plate chain conveyor.

The conveying member can also be designed for instance as a module of a modular belt chain, wherein the modular belt chain itself (also called a mat chain) serves as the conveyor.

The conveyor can be designed as a plate chain conveyor, wherein this includes conveying members in the form of plates, which are fastened to a conveying means and in particular to a conveying chain.

The conveyor can also be designed as a modular belt chain conveyor or, described differently, as a mat chain conveyor, wherein the modular belt chain includes individual conveying members in the form of modules, which are connected to one another.

The main surface of a conveying element faces the object to be conveyed. The object to be conveyed can be in contact with the main surface, for example lie on the main surface. The object to be conveyed can also be conveyed in a manner, in which it has no direct contact with the main surface, for instance if the conveyed object lies on one or more elements, which project beyond the main surface. Such elements, which project beyond the main surface, can, for instance, include rollers and/or be rollers.

The main surface covers parts of the conveyor, which are arranged below the conveyed object, to the conveyed object.

The main surface has the advantage that it can form an essentially continuous surface given a suitable arrangement of adjacent conveying members. In this context, essentially continuous means that a distance having an area of maximally 30% of the main surface is located between adjacent main surfaces. In particular, a distance having an area of maximally 15% of the main surface is located between two adjacent main surfaces.

This essentially continuous surface can prevent the conveyed object from falling through intermediate spaces between the rollers, by way of the conveyed object lying on the main surface and being held back by the main surface. A conveyor with an essentially continuous surface can be used for a multitude of different conveyed objects by way of this, and specifically simultaneously (thus mixed conveyed objects) and/or in a temporally staggered manner (alternating groups of conveyed objects of the same sort).

An essentially continuous surface also serves for the operational reliability since no or only small gaps exist between the conveying elements and a risk of jamming, snagging or dragging is low.

A roller holder is designed in a manner such that the roller is held by the roller holder.

The physical roller pivot of the roller can be designed and arranged rigidly with respect to the roller. However, the physical roller pivot of the roller can also be designed and arranged in a rotatable manner with respect to the roller. A "rotation of the roller about the roller axis" can therefore indicate a roller rotating relative to the physical roller pivot as well as a roller rotating together with the physical roller pivot.

The actuating means is a means for interacting with at least one part of the roller holder. Interacting is to be understood as a non-positive interaction. A spatial configuration at least of a part of the roller holder can be changed by the actuating means.

The roller holder is arranged on the conveying element, by which means the roller holder, the roller and the roller pivot are co-moved with the conveying element.

Since the roller pivot is movable relative to the main surface of the conveying element at least between a first position and a second position which is spatially different from the first one, the roller is also movable with the roller pivot between at least one first position and a second position which is spatially different from the first one.

"Movable relative to the main surface" means that a movement with at least a part-component in a direction that is orthogonal to the main surface is possible. In other words, "movable relative to the main surface" means that a distance to the main surface is changeable.

"Projecting beyond the main surface of the conveying element" means projecting into the conveying space. The roller, which projects at least partly beyond the main surface of the conveying element, therefore projects at least partly beyond the main surface into the conveying space. The roller simultaneously projects at least partly beyond the roller mechanism, so that the roller at least at one location projects beyond the main surface as well as beyond the roller mechanism.

The conveying space is indicated as a space that connects to the main surface and in which the object conveyed by the conveyor can be arranged.

The roller holder is designed in a manner such that the roller can assume the arrested position and in this arrested position is arrested with respect to a rotation about the roller axis and on account of this with respect to a rotation relative to the main surface. In other words, in the arrested position, the roller is arranged rigidly with respect to the main surface. In particular, in the arrested position, the roller pivot as well as the roller is spatially arrested, thus fixed, with respect to the main surface.

The roller, which projects out of the main surface in the arrested position of the roller can act for example as a driver of the conveying member. The driver increases a force action of the conveying member upon the conveyed object. What is meant by a force action is, for example, a transmission of kinetic energy from the conveying member onto the conveyed object.

The roller holder is moreover designed such that the roller can assume the freewheel position and in this freewheel position is freely rotatable relative to the main surface. Here, freely rotatable means that a running surface of the roller is free of contact with parts of the roller mechanism other than the roller. In other words, in the freewheel position the roller is mounted in a freely rotatable manner with respect to the main surface. Here, the roller pivot can likewise be freely rotatable relative to the main surface. However, in the freewheel position of the roller the roller pivot can also be arranged rigidly with respect to the main surface.

The roller, which projects out of the main surface in the freewheel position of the roller, can act, for example, as a linear bearing of the conveying member. The linear bearing serves for a practically friction-free translation of the conveyed object relative to the conveying member, thus reduces a force action of the conveying element upon the conveyed object.

The conveying member described above has the advantage that the conveying member is capable of at least two types of conveying, but despite this has a simple design.

The conveying member can be designed compactly by way of the roller neither being retracted in the conveying member in the first position nor in the second position of the roller pivot (i.e. by way of it projecting beyond the main surface in both positions).

The conveying member can be designed having a low weight even with a robust design of its embodiments.

The roller pivot can be moved from the first to the second position (and vice versa) through a reduced spatial movement. Small distances between the positions permit a rapid change between the positions and/or one which is gentle on the material.

The roller can include a running surface that is designed in a rubberised manner.

The running surface of the roller is a surface of the roller which can come into contact with the conveyed object. A rubberised running surface has a high static friction coefficient and sliding friction coefficient.

In particular, the roller can be designed in a crowned manner. This means that the running surface of the roller has a convex cross section.

Crowned rollers can come into contact with the conveyed object in a manner which is gentle on the material on account of their rounded cross section.

As an optional feature, the roller holder is designed in a manner such that in a drive position of the roller, the roller is driven in the roller holder and the roller at least partly projects beyond the main surface of the conveying element.

What is meant by a driven roller is a roller that rotates about the roller axis at a predefined speed by way of an external force action (by way of a drive).

A crowned roller, for example, permits the drive to be provided with a step-up or step-down transmission in a simple manner. The stepping-up or stepping down of the drive is effected by way of the drive driving the roller at different distances to the roller axis, which is possible due to the crowned shape. In a typical case of a transmission, the conveyed object lies on the roller at the point of the running surface, which is furthest from the roller axis. In contrast, the drive engages in a manner shifted to the point that is spaced furthest to the roller axis and lies closer to the roller axis. The conveyed object is driven with a step-down by way of this, is therefore driven at a greater speed than the drive.

It is also possible for the drive to drive the roller with a step-up—the conveyed object is thus driven at a lower speed than the drive. This can be effected, for example, by way of additional wheels and/or rollers, thus by way of a gearing mechanism.

In its drive position, the roller projects at least partly into the conveying region and thereby projects at least partly beyond the roller mechanism at least at one location.

In particular, the drive position differs from the arrested position by way of a different spatial position of the roller pivot. The position of the roller pivot in the drive position and in the freewheel position can correspond to one another. However, the position of the roller pivot in the drive position can also be different to the position of the roller pivot in the freewheel position.

Due to an additional drive position of the roller, the conveying member has the advantage that the conveying member is capable of at least three types of conveying, but despite this has a simple design.

The conveying member can be designed in a compact manner by way of the roller neither being retracted in the conveying element, which is to say below or in the main surface, in the drive position, nor the locking position, nor the freewheel position (i.e. the roller projecting beyond the main surface in all three positions).

The conveying member can be designed with a low weight even in its robust embodiments.

The roller can be moved from one of the three positions into another of the three positions of the roller by way of a small spatial movement. Small distances between the positions permit a rapid change between the positions and/or one which is gentle on the material.

As a further optional feature, the actuating means can include at least one rail, which is spatially fixed in at least one position with respect to the conveyor.

The rail itself can serve as an actuating means, by way of it being able to interact with at least a part of the roller holder.

The rail, for example, can include different regions for tasks which are different to one another. For instance, the rail can include a region for the movement of the roller pivot into the freewheel position of the roller, and a region for the drive position of the roller. In the region for the drive position, the rail can be designed, for example, in a manner such that the roller rolls on this region of the rail.

The actuating means can include several rails, which include one and/or more regions for tasks that which are different from one another.

The rail can be spatially fixed in at least one position. In this manner, the rail is not co-moved in the conveying direction of the conveyor.

The rail can be spatially fixed, for example, in a first position, in which it can interact with roller guides, and can be brought into a second spatial position, in which it cannot interact with the roller guides. In this manner, the rail and, by way of this, the actuating means can be designed so as to be able to be switched on and off.

A rail is an inexpensive and robust actuating means. Rails operate in a reliable manner and have a simple design, which entails advantages that are described further above.

As another optional feature, the roller holder includes a guide for a translatory displacement of the roller pivot.

In particular, the roller holder includes a pivot holder for the roller pivot and a sliding guide for the roller pivot with the pivot holder.

A translatory displacement permits a precise movement of the roller pivot in a certain direction with the shortest of paths. The translatory displacement of the roller pivot here is effected at least with a component perpendicular to the main surface of the conveying element.

The roller pivot can be fastened in the pivot holder in a rotationally fixed manner or in a manner rotating in this. A sliding guide is simply, inexpensively and efficiently manufacturable, serviceable and replaceable.

Alternatively, the roller holder can include a pivoting holder for a pivoting movement of the roller pivot.

Optionally, the translatory displacement is aligned essentially orthogonally to the main surface.

The translatory displacement can also be aligned orthogonally to the main surface.

In particular, a sliding direction of the sliding guide is aligned essentially orthogonally to the main surface. The sliding direction of the sliding guide can be aligned orthogonally to the main surface.

"Essentially orthogonally" means orthogonally plus/minus 30 degrees and in particular plus/minus 15 degrees. The translatory displacement (and in particular the sliding direction of the sliding guide) can therefore be effected orthogonally to the main surface or with a deviation of up to 30 degrees (and in particular of up to 15 degrees) from the perpendicular to the main surface.

A rapid and efficient movement of the roller pivot relative to the main surface can be effected by way of an alignment of the translatory displacement, which is essentially perpendicular to the main surface of the sliding guide.

As a further optional feature, the roller mechanism includes an arresting device. In the arrested position the roller thereby lies on the arresting device in the direction of gravity.

For example, a running surface of the roller lies on the arresting device.

The arresting device of the roller mechanism effects the arresting of the roller in its arrested position.

If the roller lies on arresting device in the direction of gravity, then the arresting device can act in a self-arresting manner. In this case, self-arresting means that the roller is pressed into the arresting device in the direction of gravity by way of its own weight and/or the weight of the conveyed object and in this manner, given an increasing pressure, a greater arresting force is exerted by the arresting device onto the roller.

In particular, the arresting device can serve as a lower stop for the roller, in which the roller assumes the arrested position.

What is meant by lower is a position, which is downstream in the direction of gravity. Here, a lateral shifting relative to the direction of gravity is of no significance—also with laterally shifted positions it is those which are arranged further downstream in the direction of gravity direction, which are counted as lying further to the bottom. Expressed differently, a first position lying further to the bottom, at least with regard to components, in the direction of gravity is arranged downstream of a second position lying further to the top. This analogously applies to other height details (lower, upper, same height).

Basically, in this application, the conveying member and the conveyor are described for the case of a conveying in the horizontal direction (thus transversely to the direction of gravity). The directional details are to be understood as being adapted accordingly in the case of conveying in other directions.

As an optional feature, the arresting device is designed as a braking frame. The braking frame has an opening, which corresponds to a contour of the roller, wherein in the arrested position, the roller lies on the braking frame in a manner reaching into the opening in the direction of gravity. The roller projects partly into the opening in the direction of gravity in this manner.

In particular, the roller projects through the braking frame.

Such a braking frame can act in a self-arresting manner and has a simple design. The braking frame can be arranged in a space-saving manner by way of the roller projecting through the braking frame, and this permits a compact construction manner of the conveying member.

As a further optional feature, the braking frame is rigidly fastened to the roller mechanism. Here, the braking frame is designed stationarily with respect to the conveying element.

As a further optional feature, the roller holder is designed in a manner such that a spatial position of the roller in the arrested position lies further to the bottom than in the freewheel position. In particular, in the arrested position, the roller can lie furthest to the bottom in comparison to the all other positions of the roller.

In particular, the roller in the freewheel position can be arranged furthest to the top in comparison to all other positions of the roller and in the drive position inasmuch as this is present can be arranged further to the top than in the arrested position and at the most as far to the top as in the freewheel position.

The roller in the arrested position can therefore be arranged further to the bottom than the roller in the freewheel position.

In the drive position, the roller can be arranged further to the bottom, equally high or further to the top than the roller in the freewheel position.

An arrested position arranged at the very bottom permits a self-arresting design of the roller mechanism and simultaneously a simple and compact construction manner of the conveying member.

The roller mechanism optionally includes an adjusting mechanism, which is designed in a manner such that the roller is capable of assuming different spatial lateral positions transversely to the conveying direction of the conveyor.

The roller can assume the arrested position and the freewheel position and possibly further positions (in particular the drive position) in the various lateral positions. The roller is movably fastened to the conveying member transversely to the conveying direction by way of the adjusting mechanism. In particular, the roller can be displaceably fastened in the adjusting mechanism transversely to the conveying direction. The adjusting mechanism can be designed, for example, as a rail, on which movably assembled rollers are arranged.

The adjusting mechanism permits a targeted change of the roller position and thus an adaptation of the conveying characteristics of the conveying member to different conveyed objects. The conveying member can be applied in a comprehensive and flexible manner in this way.

A further aspect of the invention relates to a conveyor, which includes a conveying member according to the invention (as described above), as well as an actuating means. Here, the roller pivot can be moved relative to the main surface of the conveying element between at least two positions, which are spatially different from one another, by way of the actuating means.

The optional features and all respective advantages of the conveying member according to the invention are described above and are also applicable to the conveyor.

Concerning the conveyor, the actuating means is optionally arranged and designed in a manner such that in the freewheel position of the roller it supports the roller pivot counter to the direction of gravity in a direct or indirect manner and the roller is freely rotating due to this.

The actuating means thus brings the roller into the freewheel position by way of it supporting the roller pivot to the top. The actuating means can support the roller pivot to the top in a direct manner, thus in a contact fit with the roller pivot, or indirectly, thus without direct contact but, for example, via indirect contact, for instance via a contact fit with pivot holders. The arrested position can be arranged further to the bottom by way of this.

As a further optional feature of the conveyor, the conveying member includes an upper stop for the roller pivot, the stop being designed and arranged in a manner such that in the freewheel position, the actuating means is capable of pressing the roller pivot directly or indirectly against the upper stop counter to the direction of gravity.

The actuating means can be designed and positioned in a simple and robust manner by way of an upper stop for the freewheel position, wherein the roller is simultaneously capable of reliably assuming the freewheel position.

In the case for example that the roller pivot is held in the pivot holder, the pivot holder can be pressed against the upper stop when the roller is to be in the freewheel position.

As another optional feature of the conveyor, in the drive position, the running surface of the roller can be in frictional contact with a rolling guide (rolling guidance). Here, the rolling guide in particular is encompassed by the actuating means.

The roller is thus driven by the rolling of the running surface of the roller on the rolling guide. The rolling guide, for example, can be formed on the actuating means. Thus, for instance, an actuating means and in particular a rail, at a side of the roller, which lies opposite the main surface, can be in frictional contact with the running surface of the roller and form a rolling guide in such a manner.

A drive by way of a rolling guide is simply and inexpensively manufacturable, serviceable and repairable. A rolling guide can be designed in a simple and robust manner.

In particular, the conveyor can be designed as a plate chain conveyor. Here, the conveying member is designed as a plate fastened to a chain.

Alternatively, the conveyor can be designed as a mat chain conveyor (also called a modular belt chain conveyor). Here, the conveying elements are connected to one another into a mat chain, which is to say the modules of the modular belt chain are designed as a conveying element.

The optional features of the conveying member and/or of the conveyor can be combined with one another.

BRIEF DESCRIPTION OF THE DRAWINGS

The subject-matter of the invention is hereinafter explained in more detail by way of preferred embodiment examples which are represented in the accompanying drawings. There, in each case schematically shown in:

FIG. 1 is a perspective view from above onto a conveying element;

FIG. 2 is a view of the conveying element of FIG. 1, from the front;

FIG. 3 is a perspective view of the conveying element of FIG. 1 from below;

FIG. 9 is a view from the front onto a part of the conveyor of FIG. 8.

DETAILED DESCRIPTION OF THE INVENTION

Figure 4:
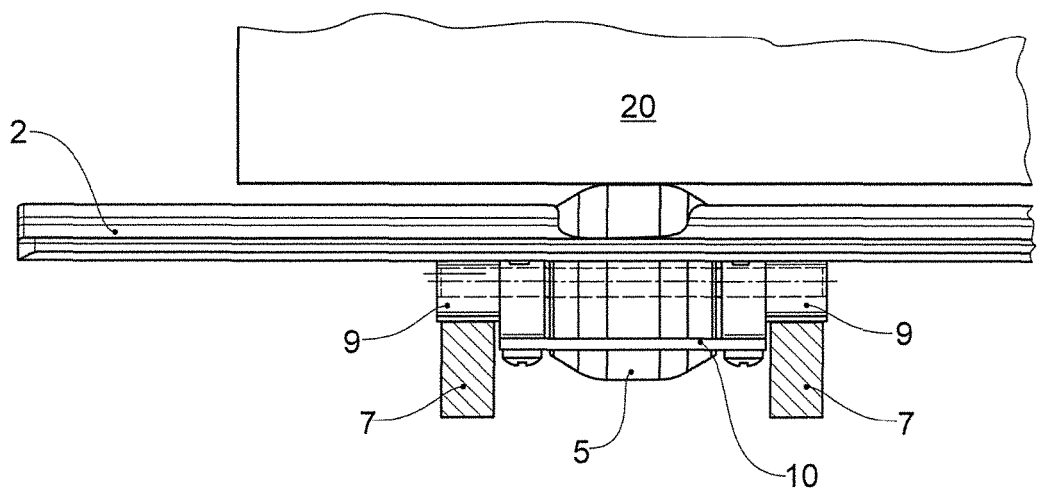
FIG. 4 is a detail of a view of the conveying element of FIG. 1 from the front, with a roller in the freewheel position.

Generally, the same parts are provided with the same reference numerals in the figures. FIGS. 1 to 7 show an embodiment example of a conveying member 1 and FIGS. 8 and 9 show parts of an embodiment example of a conveyor 11.

A perspective view from above onto an embodiment example of a conveying member 1 according to the invention is represented in FIG. 1. The conveying member 1 includes the conveying element 2. The conveying element 2 has a rectangular outline seen from above. Broad sides of the conveying element run along the conveying direction F and are about 13 cm long. Long sides of the conveying element 2 run transversely to the conveying direction F and are about 40 cm long.

The conveying element 2 is designed in a stepped manner on its upper side. A step 16 of the conveying element 2 is formed with a sharp bend, thus in a v-shaped manner, transversely to the conveying direction F and on the upper side of the conveying element 2 connects a surface lying further to the bottom and a surface lying further to the top, wherein the surface lying further to the top is referred to as the main surface 8. The object 20 to be conveyed can come to lie on this main surface 8. In the regular case, the object 20 to be conveyed however comes to lie exclusively on the rollers 5 of the conveying element 2.

The surface of the upper side of the conveying element 2, which lies further to the bottom, is at least partly covered by a part of an adjacent conveying element 2 on application of the conveying member 1 in a conveyor 11. The conveying elements 1 are formed in this manner, so that adjacent conveying members 1 can overlap and the main surfaces 8 of adjacent conveying members 1 can come to lie in essentially in the same plane by way of this. The v-shape of the step 16 here permits a rotation (a rotation lying in plane encompassing the main surface 8, a so-called side bow) of adjacent conveying members 1 relative to one another, the rotation being directed transversely to the conveying direction F. The step 16 in the conveying element 2 is designed obliquely in the conveying direction F and disregarding rounded edges has an inclination of 45 degrees.

The conveying element 2 includes two openings in the main surface 8, through which openings a roller 5 extends upwards through the conveying element 2 from below the main surface 8. The openings lie roughly in the middle of the conveying element 2 considered in the conveying direction F, and both openings are distributed over the width of the conveying element 2 transversely to the conveying direction F. The rollers 5 therefore divide the conveying element 2 into three sections transversely to the conveying direction F.

FIG. 2 shows a view of the conveying member 2 of FIG. 1 from the front, thus viewed counter to the conveying direction F. The two rollers 5 are each encompassed by a roller mechanism 3 and are in the arrested position. Both roller mechanisms 3 are each arranged below the main surface 8. Additionally to a roller 5, each of the two roller mechanisms 3 includes a roller holder 4 and an arresting device 10. The roller holder 4 here includes two pivot holders 9 which hold the hold the pivot 6 of the roller 5 at both sides of the roller 5.

A perspective view of the conveying member 1 of FIG. 1 from below is represented in FIG. 3. A trapezoidal shape of the arresting device 10 can be easily recognised. Here, the axis of symmetry of the arresting device 10 is aligned transversely to the conveying direction F, and the narrow ends of the trapezoidal arresting devices 10 face the broad sides of the conveying element 2. The arresting devices 10 are arranged along one of its oblique sides of the v-shaped step of the conveying element 2 (considered in a projection onto the main surface 8) by way of this arrangement.

The arresting device 10 is designed as a metal plate that includes an opening. The shaping of this opening of the arresting device 10 and its dimensioning is such that the roller 5 can project into the opening and the running surface of the roller 5 can come into a contact fit with edges of the opening of the arresting device 10. If the roller 5 is in the arrested position, then the running surface of the roller 5 lies on the arresting device 10 in the direction of gravity and the roller 5 projects partly through the opening of the arresting device 10. The arresting device 10 is fastened to the conveying element 2 in a rigid and stationary manner and as a lower stop limits the movement of the roller 5 and thus also of the roller pivot 6 downstream in the direction of gravity. In the present case, the arresting device 10 is screwed on supports, which are formed by the conveying element 2, and is arranged parallel to the main surface 8.

The roller pivot 6 is designed as a metal pin, about which the roller 5 is mounted in a freely rotating manner. The roller pivot 6 projects out of the roller 5 at both sides of the roller 5, then runs through an elongate opening, which is formed by the conveying element 2 and which is designed as a linear sliding guide, and at both sides ends in a pivot holder 9. The roller pivot 6 is connected rigidly and thus in a rotationally fixed manner to the pivot holders 9. The linear sliding guide, which is formed by the conveying element 2, guides the roller pivot 6 orthogonally to the main surface 8. The conveying element 2 and the pivot holders 9 are manufactured of plastic.

The arresting device 10 thus serves as a lower stop for the roller 5, by way of the running surface of the roller 5 being able to lie thereon downstream in the direction of gravity. The arresting device 10 acts upon the roller 5 in a self-arresting manner due to the weight of the roller and/or of the object to be conveyed. The roller pivot 6 can be moved in the direction of the main surface 8 by way of the linear sliding guide, wherein the conveying element 2 has formed an upper stop for this movement, on which stop the pivot holders 9 can come to abut. The conveying element 2 thus forms an upper stop for the pivot holders 9 and thus indirectly for the roller pivots 6 and the rollers 5, and the rollers 5 are situated in the freewheel position in this position. The rollers are in the arrested position when the rollers 5 lie on the lower stop on the arresting device 10.

The pivot holders 9, the linear sliding guide for the roller pivot 9, formed by the conveying element 2, and the upper stops for the pivot holders 9, formed by the conveying element 2, are encompassed by the roller holder 4.

The rollers 5 have a crowned shape. The cross section of the rollers 5 (thus a section along the roller axis 6) therefore has a convex shape, wherein the running surface of the rollers 5 is somewhat flattened. The running surfaces of the rollers 5 are rubberised, and the rollers 5 themselves consist of plastic.

A detail of a section of a view of the conveying element 1 of FIG. 1 from the front is represented in FIG. 4, wherein a roller 5 is situated in the freewheel position. The conveyed object 20 is also represented in FIG. 4 and lies on the running surface of the roller 5. The object 20 to be conveyed lies on the roller 5 and in the regular case is conveyed by way of contact with the rollers 5. However, the object 20 to be conveyed can also be in contact with the main surface 8 and, for example, at least partly lie on this.

The freewheel position of the roller 5 in FIG. 4 is achieved by way of the two actuating means 7, which are designed as separate rails supporting the pivot holders 9 of the roller 5 from below and pressing these upwardly onto the upper stop. The pivot holders 9 thus lie on the actuating means 7 and by way of this are pressed upwards against the conveying element 2, which for this has formed upper stops. In this position, the roller 5 in FIG. 4 is situated on the freewheel position, thus can freely rotate. The object 20 to be conveyed can thus be moved relative to the conveying member 1 with a low force effort via the rollers 5, which are in the freewheel position and which act as linear bearings of the conveying member 1. The conveying member 1, for example, can be moved below the conveyed object 20, without a large force being applied upon the conveyed object 20. In other words, the transmission of a movement energy of the conveying member 1 onto the conveyed object 20 is negligible due the rollers 5 being in the freewheel position. The conveying member 1 is therefore suitable for being applied as an accumulating conveyor, where the conveying member 1 is moved, but the conveyed object 20 is accumulated if necessary, i.e. can be held back in comparison to the movement of the conveying member 1.

Figure 5:
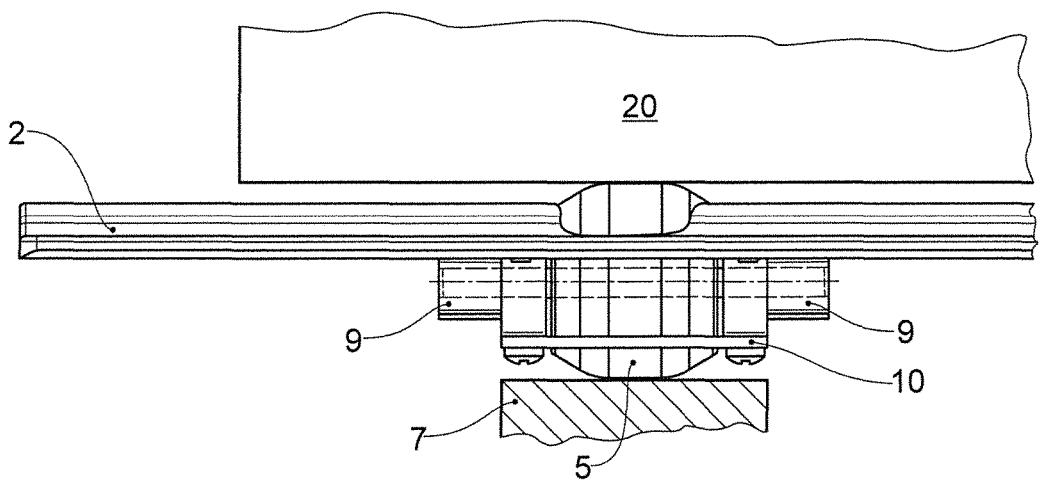
FIG. 5 is a detail analogously to FIG. 4, with the roller in the drive position.

A detail is represented in FIG. 5 analogously to FIG. 4, but with the roller 5 in the drive position. In contrast to FIG. 4, FIG. 5 only has one actuating means 7. This actuating means 7 although likewise being designed as a rail, however this rail on its side which is directed to the top includes a rolling guide, on which the running surface of the roller 5 lies from above. The rolling guide (thus the actuating means 7) supports the roller 5 from below and drives the roller 5 by way of this.

The rolling guide includes a plane surface, which is aligned parallel to the main surface 8. The actuating means 7 thereby engages on the roller 5 at the point that is furthest from the roller pivot 6, just as the conveyed object 20 on the opposite side of the roller 5. The transmission ratio of the drive is therefore 1, which means that the speed between the actuating means 7 and the conveying member 1 is equally large as the speed between the conveyed object 20 and the conveying member 1. The conveyed object 20 thus, driven by the roller, moves twice as fast relative to the actuating means 7 than the conveying member 1.

With this embodiment of the conveying member 1, specifically with the pivot holders 9 bearing on the upper stop, the spatial position of the roller pivot 6 and thus also of the roller 5 is identical in the freewheel position and in the drive position. However, the drive position can also lie further to the bottom than the freewheel position. However, in another embodiment and/or application the freewheel position can again lie further to the bottom than the drive position. The running surface of the roller 5 however cannot come into contact with the arresting device 10 in the drive position as well as in the freewheel position.

Figure 6:
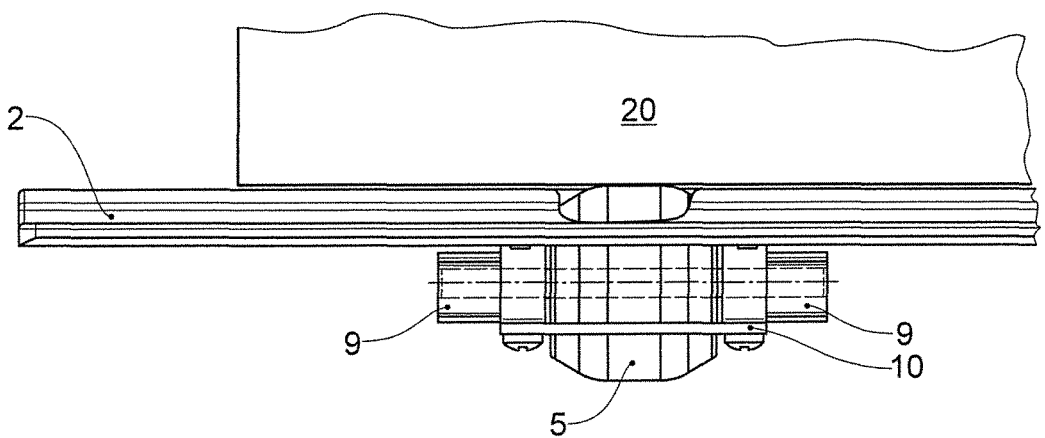
FIG. 6 is a detail analogously to FIG. 4, with the roller in the arrested position.

FIG. 6 shows a detail analogously to FIG. 4. Here, the roller 5 is in the arrested position. As already described further above with regard to FIG. 3, the arresting device 10 serves as a lower stop for the roller 5, by way of the rolling surface of the roller 5 lying on this stop downstream in the direction of gravity. In FIG. 6, the roller 5 now lies on the arresting device 10 and is in the arrested position. The arrested position is the position of the roller 5 which lies furthest to the bottom. The roller 5 is pressed into the arresting device 10 by way of the weight of the roller 5 and of the conveyed object 20, and this device thus functions in a self-arresting manner.

Figure 7:
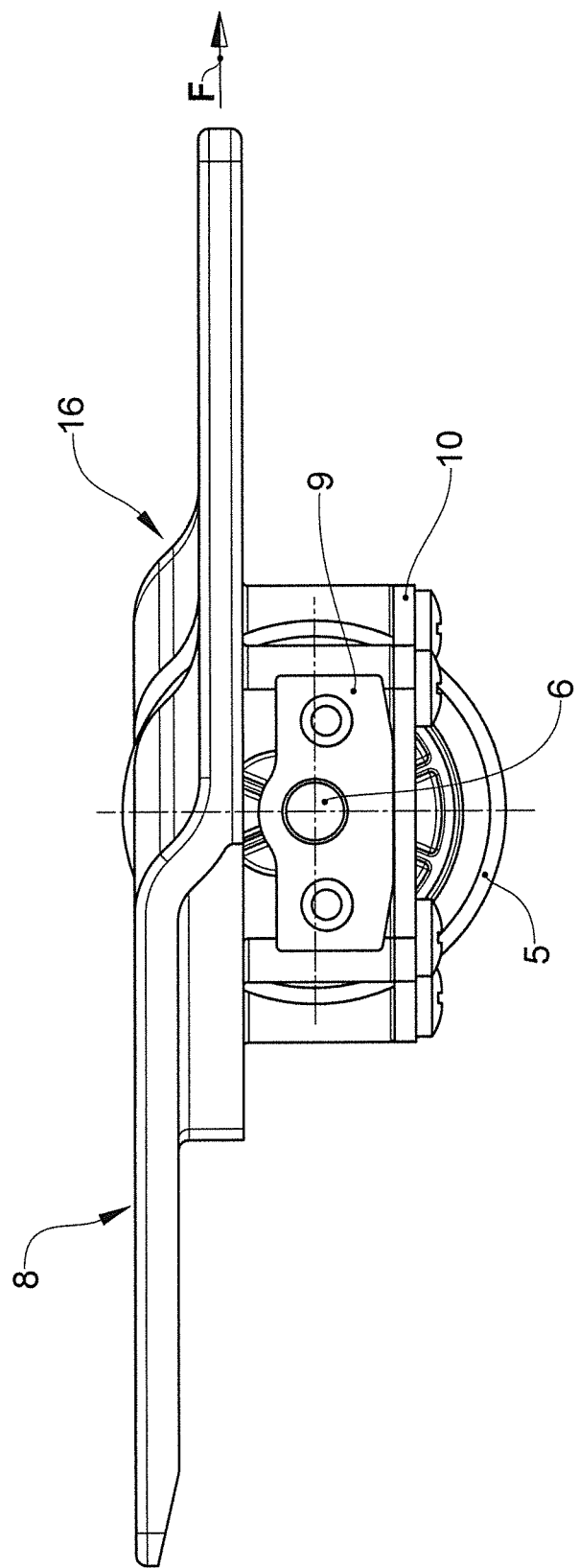
FIG. 7 is a lateral view of the conveying element of FIG. 1.
Figure 8:
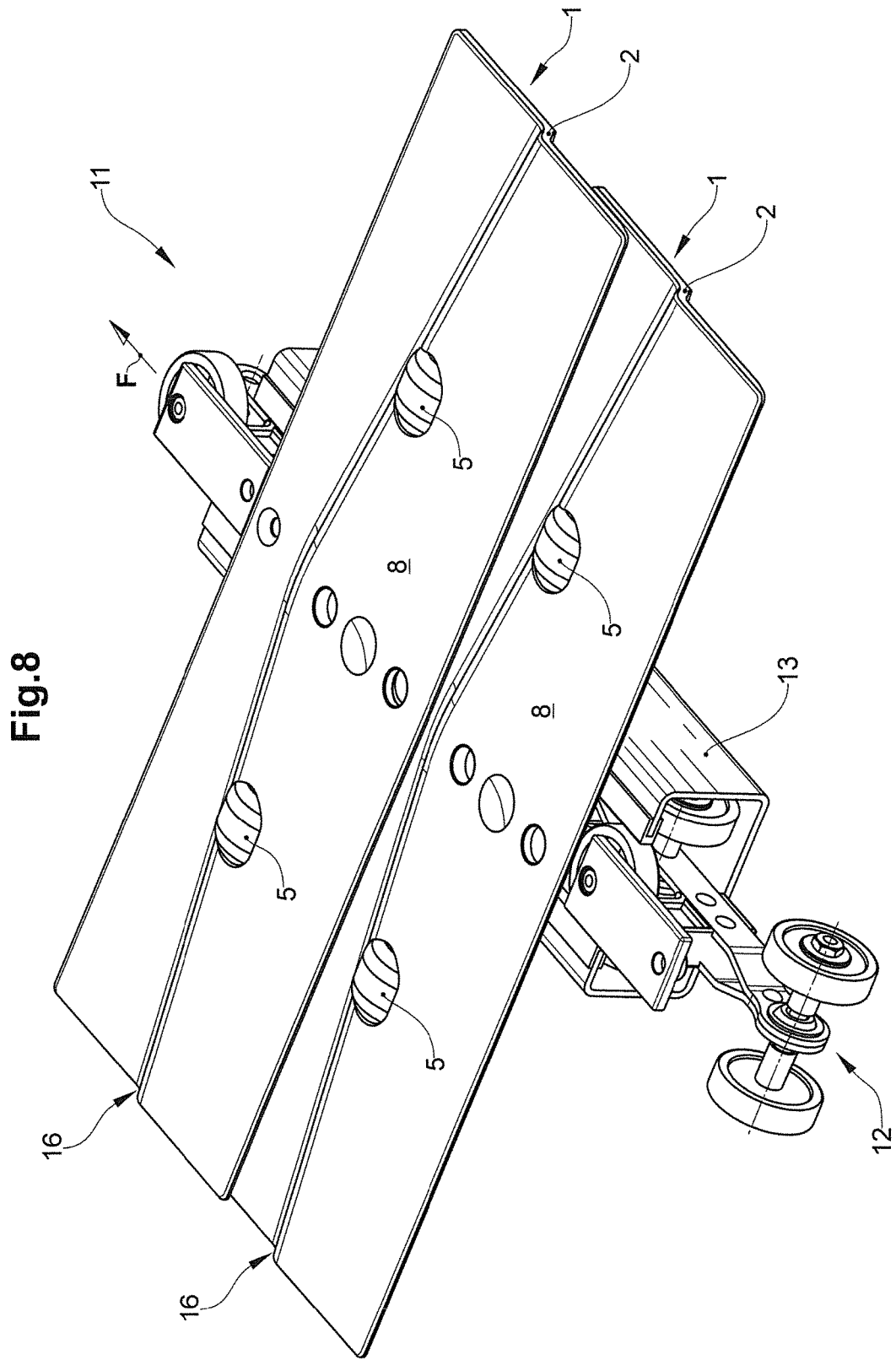
FIG. 8 is a perspective view from above onto a part of the conveyor including the conveying member of FIG. 1.

A lateral view of the conveying member 1 of FIG. 1 is represented in FIG. 7. The roller 5 is thereby in the arrested position.

FIG. 8 shows a perspective view from above onto a part of a conveyor 11, which includes conveying members 1 of FIG. 1. The conveying members 1 are fastened on a chain 12 by way of the conveying elements 2 each being rigidly fastened to an individual link of the chain 12. The chain 12 is led through a chain channel 13, which partly surrounds the chain 12 and encompasses it in a c-shaped manner. The conveyor 11 is designed as a plate chain conveyor, wherein the plates include the conveying members 1 and these plates are fastened on the chain 12.

A view from the front onto a part of the conveyor 11 of FIG. 8 is represented in FIG. 9. In FIG. 9, the rollers 5 are represented in the drive position, wherein the actuating means 7 are positioned below the rollers 5.

The invention claimed is:

1. A conveying member with an actuating device for a conveyor, comprising:
    a conveying element that forms a main surface, and at least one roller mechanism with at least one roller that comprises a physical roller pivot, wherein the roller mechanism comprises a roller holder, the roller pivot is fastened to the roller holder, the roller holder can interact with the actuating device, the roller holder is arranged on the conveying element and the roller holder is designed such that the roller pivot is movable by the actuating device relative to the main surface of the conveying element at least between a first position and a second position which is spatially different than the first position with regard to a distance to the main surface,
    wherein in the first as well as in the second position of the roller pivot, the roller projects at least partly beyond the main surface of the conveying element and, in the first position of the roller pivot, the roller is in an arrested position, and in the second position of the roller pivot, the roller is in a freewheel position, wherein in the arrested position, the roller is arrested with respect to a rotation relative to the main surface and in the freewheel position the roller is freely rotating.

2. The conveying member with an actuating device according to claim 1, wherein the roller holder is designed such that in a drive position of the roller, the roller is driven in the roller holder and at least partly projects beyond the main surface of the conveying element.

3. The conveying member with an actuating device according to claim 1, wherein the actuating device comprises at least one rail that is spatially fixed in at least one position with respect to the conveyor, the at least one rail supporting the roller pivot and pressing the roller pivot relative to the conveying element.

4. The conveying member with an actuating device according to claim 1, wherein the roller holder includes a guide for a translatory displacement of the roller pivot between the first and second positions.

5. The conveying member with an actuating device according to claim 4, wherein the translatory displacement is aligned essentially orthogonally to the main surface.

6. The conveying member with an actuating device according to claim 1, wherein the roller mechanism comprises an arresting device and the roller in the arrested position lies on the arresting device in the direction of gravity.

7. The conveying member with an actuating device according to claim 6, wherein the arresting device is designed as a braking frame that comprises an opening corresponding to a contour of the roller, wherein the roller in the arrested position lies on the braking frame in a manner reaching into the opening in the direction of gravity and by way of this projects partly into the opening in the direction of gravity.

8. The conveying member with an actuating device according to claim 7, wherein the braking frame is rigidly fastened to the roller mechanism and is designed in a stationary manner with respect to the conveying element.

9. The conveying member with an actuating device according to claim 1, wherein the roller holder is designed such that a spatial position of the roller in the arrested position lies further to the bottom than in the freewheel position and the roller in the arrested position lies furthest to the bottom compared to all other positions of the roller.

10. The conveying member with an actuating device according to claim 1, wherein the roller mechanism comprises an adjusting mechanism which is designed such that the roller is capable of assuming different spatial lateral positions transversely to the conveying direction of the conveyor.

11. The conveying member comprising a conveying member with an actuating device according to claim 1, wherein the roller pivot can be vertically moved relative to the main surface of the conveying element between at least two positions which are spatially different from one another, by way of the actuating device.

12. The conveying member according to claim 11, wherein the arrangement and design of the actuating device is such that in the freewheel position of the roller, the actuating device directly or indirectly supports the roller pivot counter to the direction of gravity and the roller is freely rotating thereby.

13. The conveying member according to claim 11, wherein the conveying member comprises an upper stop for the roller pivot, said upper stop being designed and arranged in a manner such that in the freewheel position, the actuating device is capable of directly or indirectly pressing the roller pivot against the upper stop counter to the direction of gravity.

14. The conveying member according to claim 1, wherein, in the drive position, the running surface of the roller can be in frictional contact with a rolling guide, wherein the rolling guide in particular is encompassed by the actuating device.

15. The conveying member according to claim 11, wherein the conveyor is designed as one of a plate chain conveyor and a mat chain conveyor.

* * * * *